(12) United States Patent
Spehr et al.

(10) Patent No.: US 11,345,371 B2
(45) Date of Patent: May 31, 2022

(54) EVALUATION OF COMPONENTS OF DRIVING FUNCTIONS AND ROADWAY DETECTION IN DIFFERENT PROCESSING STAGES

(71) Applicant: VOLKSWAGEN AKTIENGESELLSCHAFT, Wolfsburg (DE)

(72) Inventors: Jens Spehr, Salzgitter (DE); Tran Tuan Nguyen, Wolfsburg (DE)

(73) Assignee: Volkswagen Aktiengesellschaft

( * ) Notice: Subject to any disclaimer, the term of this patent is extended or adjusted under 35 U.S.C. 154(b) by 190 days.

(21) Appl. No.: 16/754,667

(22) PCT Filed: Sep. 25, 2018

(86) PCT No.: PCT/EP2018/075985
§ 371 (c)(1),
(2) Date: Apr. 8, 2020

(87) PCT Pub. No.: WO2019/072550
PCT Pub. Date: Apr. 18, 2019

(65) Prior Publication Data
US 2020/0353951 A1 Nov. 12, 2020

(30) Foreign Application Priority Data
Oct. 10, 2017 (DE) ...................... 10 2017 009 435.7

(51) Int. Cl.
*B60W 60/00* (2020.01)
*B60W 30/00* (2006.01)
(Continued)

(52) U.S. Cl.
CPC ........ *B60W 60/0025* (2020.02); *B60W 30/00* (2013.01); *B60W 40/06* (2013.01);
(Continued)

(58) Field of Classification Search
CPC .. B60W 60/0025; B60W 30/00; B60W 40/06; B60W 50/0205; B60W 2552/20;
(Continued)

(56) References Cited

U.S. PATENT DOCUMENTS

2020/0317216 A1* 10/2020 Konrardy .......... B60W 50/0098

FOREIGN PATENT DOCUMENTS

| DE | 102013003944 A1 | 9/2014 |
| DE | 102013219414 A1 | 3/2015 |

(Continued)

OTHER PUBLICATIONS

Adrian Rechy Romero, Paulo Vinicius Koerich Borges, Alberto Elfes, Andreas Pfrunder; Environment-Aware Sensor Fusion for Obstacle Detection; 2016; IEEE, pp. 114-120 (Year: 2016).*

(Continued)

*Primary Examiner* — Aniss Chad
*Assistant Examiner* — Chase L Cooley
(74) *Attorney, Agent, or Firm* — Barnes & Thornburg, LLP

(57) ABSTRACT

A method and an apparatus for the evaluation of detection results of components for road detection, of the road estimated by a road estimation, and/or of the planned trajectory of the driver assistance systems of an ego-transportation vehicle, wherein the detection results, the estimated road, and the planned trajectory are designated a hypothesis. To evaluate the components, the road estimation, or the driver assistance system, use is made of a metric based on the manually covered trajectory of the ego-transportation vehicle, wherein the deviation between the manually traveled trajectory and the hypothesis is determined for predefined reference points at a predefined interval from a starting point in a transportation vehicle-based x-y coordinate system and by using the evaluation, it is determined (Continued)

whether the hypothesis of the components for road detection, the road estimation, and/or the driver assistance system fulfill predefined criteria.

14 Claims, 6 Drawing Sheets

(51) Int. Cl.
  *B60W 40/06* (2012.01)
  *B60W 50/02* (2012.01)
  *G01C 21/34* (2006.01)
  *G01S 19/42* (2010.01)
  *G06V 20/56* (2022.01)

(52) U.S. Cl.
  CPC ..... *B60W 50/0205* (2013.01); *G01C 21/3407* (2013.01); *G01C 21/3461* (2013.01); *G01S 19/42* (2013.01); *G06V 20/588* (2022.01); *B60W 2552/20* (2020.02)

(58) Field of Classification Search
  CPC . G01C 21/3407; G01C 21/3461; G01S 19/42; G06K 9/00798; G06T 2207/30241; G06T 2207/30256; G06T 7/20
  See application file for complete search history.

(56) References Cited

FOREIGN PATENT DOCUMENTS

| | | |
|---|---|---|
| DE | 102015012648 A1 | 3/2017 |
| DE | 102015218361 A1 | 3/2017 |
| EP | 2974943 A2 | 1/2016 |

OTHER PUBLICATIONS

Acroname; Hokuyo UTM-30LX-EW Scanning Laser Rangefinder (30m); 2012; https://acroname.com/; pp. 1-2 (Year: 2012).*

Garcia-Fernandez et al.; Bayesian Road Estimation Using Onboard Sensors; IEEE Transactions on Intelligent Transportation Systems; Aug. 1, 2014; vol. 15, No. 4.

Hartmann et al.; Towards autonomous self-assessment of digital maps; 2014 IEEE Intelligent Vehicles Symposium Proceedings; Jun. 8, 2014; pp. 89-95 (abstract).

Klotz et al.; Lane data fusion for driver assistance systems; Jan. 1, 2004; downloaded from http://citeseerx.ist.psu.edu/viewdoc/download?doi=10.1.1.1.3316&rep=rep1&type=pdf.

Nguyen et al.; Learning of Lane Information Reliability for Intelligent Vehicles; 2016 IEEE International Conference on Multisensor Fusion and Integration for Intelligent Systems; Sep. 19-21, 2016; Baden-Baden, Germany.

Nguyen et al.; A survey of performance measures to evaluate ego-lane estimation and a novel sensor-independent measure along with its applications; 2017 IEEE International Conference on Multisensor Fusion and Integration for Intelligent Systems; Nov. 16, 2017.

Romero et al.; Environment-Aware Sensor Fusion for Obstacle Detection; 2016 IEEE International Conference on Multisensor Fusion and Integration for Intelligent Systems; Sep. 19-21, 2016; Baden-Baden, Germany.

Sarholz et al.; Evaluation of different approaches for road course estimation using imaging radar; 2011 IEEE/RSJ International Conference on Intelligent Robots and Systems (IROS); Sep. 25, 2011 (abstract).

Search Report for International Patent Application No. PCT/EP2018/075985; dated Jan. 4, 2019.

* cited by examiner

EVALUATION OF COMPONENTS OF DRIVING FUNCTIONS AND ROADWAY DETECTION IN DIFFERENT PROCESSING STAGES

PRIORITY CLAIM

This patent application is a U.S. National Phase of International Patent Application No. PCT/EP2018/075985, filed 25 Sep. 2018, which claims priority to German Patent Application No. 10 2017 009 435.7, filed 10 Oct. 2017, the disclosures of which are incorporated herein by reference in their entireties.

SUMMARY

Illustrative embodiments relate to a method for the evaluation of components for roadway detection on the basis of the detection results and of driver assistance systems on the basis of the planned trajectories, to a corresponding apparatus, and to a system for offline evaluation of manually traveled-along trajectories in various surroundings scenarios.

BRIEF DESCRIPTION OF THE DRAWINGS

A disclosed embodiment will be explained below with reference to the drawings, in which.

DETAILED DESCRIPTION

Figure 1:
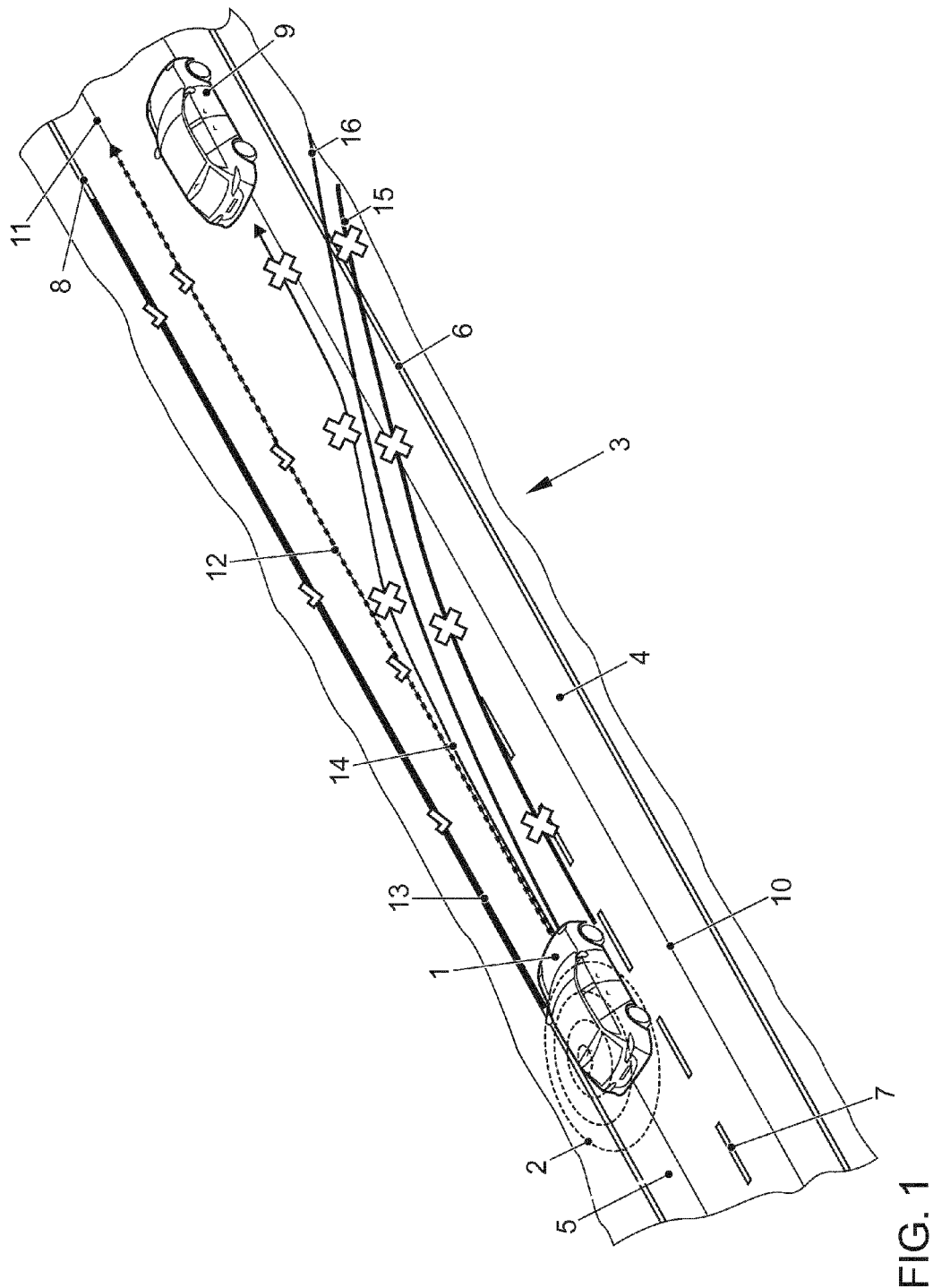
FIG. 1 shows an illustration of the underlying problem.

With roadway detection, such as is a precondition for an automatic driving function, there is the problem that the detectors which are used, for example, for the detection of roadway markings and the roadway detection exhibit different behaviors depending on regions and environmental conditions. For example, the camera-based detection of roadway markings usually functions well on highways and country roads, but its performance drops in urban scenarios, where frequently asphalt crossings or curbstones bound the roadway. In such cases an alternative consists in following the transportation vehicle in front, the curbstone and/or the crash barrier or not offering the driving function at all.

This problem also occurs during the continuous development of such systems for roadway detection, wherein the problem consists in the fact that new software versions also have a different behavior than earlier versions, as a result of which the detection behavior of the system could change.

In addition, systems for roadway detection are, under certain circumstances, subject to the following problems:

The data sheets of providers of systems for roadway detection are in some cases not sufficient and the informative value thereof is dependent on test scenarios.

Not all situations can be simulated or transferred to real conditions.

Image-based evaluation approaches require camera images such as, for example, pixel labeling. However, the image-based evaluation approaches cannot be applied to roadway hypotheses from other sources without a back-transformation into the camera image, which entails additional expenditure.

An on-road evaluation of the systems, i.e., real journeys with the activation of the automatic driving function, is extremely difficult and dangerous since fault sources are usually only difficult to identify during real journeys, or many faults cannot be predicted. For example, in the case of an on-road evaluation it is usually not possible to detect whether the fault source can be attributed to the detectors, such as, for example, camera, transportation vehicle in front, map, etc., the roadway detection or the path planning.

It is possible to assess automatic driving functions by highly accurate GPS receivers and highly accurate maps, but this is an expensive solution. Highly accurate maps with a highly accurate position of the markings and lanes are available only for certain regions so that this possibility is also limited.

In the publication T. T. Nguyen et al.: "Learning of Lane Information Reliability for Intelligent Vehicles", 2016 IEEE International Conference on Multisensor Fusion and Integration for Intelligent Systems, Baden-Baden, Germany, Sep. 19-21, 2016, the reliability of the roadway estimation is evaluated by a metric which is based on a manually traveled-along trajectory and determines the angular deviation between this trajectory and the hypothetical roadway estimation.

Document EP 2 974 943 A2 describes a lane sensing system which senses a lane, with a vehicle-position-sensing system which senses the actual position of a transportation vehicle relative to the lane, a controller system which acquires a control deviation with the actual position of the transportation vehicle relative to the lane and of a setpoint position of the transportation vehicle relative to the lane and acquires an adjustment signal therefrom, and a steering actuator to which the controller system is applied with the adjustment signal in such a way that the actual position of the transportation vehicle is adjusted to the setpoint position of the transportation vehicle. In this context, the lateral guidance system is embodied in such a way that the controller system contains at least two controllers or at least one controller of at least two parameter sets, wherein the control characteristics which are respectively generated by the controller or respectively by the parameter sets are different. Furthermore, a controller selection system is provided which uses auxiliary devices to detect at least one variable which influences the driving situation, and depending on the value of the at least one variable, the controller selection system selects one of the controllers or one of the parameter sets for use in the controller system, and the controller system outputs an adjustment signal to the steering actuator using the selected controller or the selected parameter set.

Document DE 10 2015 012 648 B4 describes a method for operating at least one vehicle system of the transportation vehicle, the system comprising at least one transportation vehicle guidance function for performing at least partially automatic guidance of a transportation vehicle, wherein the transportation vehicle has at least one surroundings sensor which is directed onto the area in front of the transportation vehicle and whose surroundings data are evaluated in an evaluation unit of the transportation vehicle with respect to a future profile, described by a hypothesis data record, of the lane which is currently being traveled along by the transportation vehicle, after which the hypothesis data record is transferred to the transportation vehicle system and is taken into account in the execution of the at least one transportation vehicle guidance function, characterized in that in the evaluation unit a plurality of hypothesis data records which are assigned to different future profiles are acquired and assessed with respect to their reliability through the assignment of a reliability value, wherein a plurality of hypothesis data records, having a reliability value which exceeds a threshold value, are transferred from the evaluation unit to the transportation vehicle system, and a hypothesis data record which is to be used in the execution of the transportation vehicle guidance function is selected from the transferred hypothesis data records, by at least one executed transportation vehicle guidance function of the transportation vehicle system as a function of a transportation vehicle property and/or the current driving situation.

Document DE 10 2013 003 944 A1 describes a method for making available a driver assistance functionality, wherein a predefined catalog of road scenarios is loaded and sensor data are obtained. The catalog comprises a plurality of road scenarios which each describe a road situation by a parameterized surroundings feature. The sensor data respectively describe a measured surroundings feature. A probability value for the road scenarios is respectively obtained from a comparison of the respective at least one measured surroundings feature with the at least one parameterized surroundings feature. A road scenario, on the basis of which a driver assistance functionality is made available, is selected on the basis of the probability values.

The disclosed embodiments provide a cost-effective evaluation of
sensors for roadway detection such as detectors for roadway markings, curbstones etc.,
driver assistance systems in their entirety, and
to make available a driver assistance system on the basis of the planned trajectories, and
a system for producing availability maps for an automatic driving function on the basis of these evaluation results.

This is achieved by the disclosed method, the disclosed apparatus, and the disclosed system.

In the disclosed method for the evaluation of detection results of components for roadway detection, of the roadway which is estimated by a roadway estimation process and/or of the planned trajectory of the driver assistance systems of an ego transportation vehicle which are using, wherein the detection results, the estimated roadway and the planned trajectory are referred to as a hypothesis,
for the evaluation of the components, of the roadway estimation or of the driver assistance systems a metric is used which is based on the trajectory traveled along manually by the ego transportation vehicle, wherein the deviation between the manually traveled-along trajectory and the hypothesis for predefined reference points is determined at a predefined distance from a starting point in a transportation vehicle-based x-y coordinate system, and
on the basis of the evaluation it is determined whether the hypothesis of the component for roadway detection, the hypothesis of the roadway estimation and/or the hypothesis of the driver assistance system fulfill predefined criteria.

In this way, the parallelism of the manually traveled-along trajectory is determined with the hypothesis without the use of highly accurate GPS and a highly accurate map being necessary.

The basic metric for the evaluation is defined as follows:
determining the angle between the reference point at the predefined distance between the manually traveled-along trajectory and the x axis, running in the direction of travel, of the transportation vehicle-based coordinate system at the starting time,
determining the angle between the reference point at the predefined distance between the hypothesis and the x axis, running in the direction of travel, of the transportation vehicle-based coordinate system at the starting time,
determining the absolute value of the difference between the two abovementioned angles,
comparing the absolute value of the angular difference with a predefined threshold for the evaluation of the device or of the driver assistance system, and
classifying the hypothesis into the criteria of usable or unusable on the basis of the comparison result.

The metric provides a favorable method for determining ground-truth data, wherein a lateral offset of the manually traveled-along trajectory on the respective roadway section is not significant, as a result of which the assessment of various detectors or devices for roadway detection is independent of the position of the manual trajectory on the roadway section.

The predefined threshold may be 1° to 3°, in particular, 2°. Relatively large values would make the information about the parallelism between the manual trajectory and the hypothesis less precise.

Alternatively, instead of the manually traveled-along trajectory it is also possible to use a highly accurate map if the highly accurate map is available. Both types of ground-truth data, specifically a highly accurate map and a manually traveled-along trajectory do not differ very much from one another.

In addition to the metric of the angular difference, the Euclidean distance between the reference points of the manually traveled-along trajectory and the hypothesis may be determined and used as a further metric for the evaluation of the hypothesis. In this way, statements can be made by a plurality of metrics which are independent of one another, as a result of which the evaluation becomes more reliable. Accordingly, a measure which combines the evaluation results of different metrics in a weighted state can be calculated.

In a further exemplary embodiment of the disclosed method, for the evaluation of detection results of components for roadway detection, of the roadway estimated by a roadway estimation process and/or of the planned trajectory of the driver assistance systems of an ego transportation vehicle which are using, wherein the detection results, the estimated roadway and the planned trajectory are referred to as a hypothesis, and wherein this disclosed embodiment can also comprise the method described above,
for the evaluation of the devices or of the driver assistance systems a metric is used which is based on a trajectory of the ego transportation vehicle, wherein the deviation between the trajectory and the hypothesis is determined for predefined reference points at a predefined distance from the starting point in a transportation vehicle-based x-y coordinate system, and
on the basis of the evaluation it is determined whether the hypothesis of the component for roadway detection, the hypothesis of the roadway estimation and/or the hypothesis of the driver assistance system fulfill predefined criteria.

In this disclosed embodiment, further metrics can be used for the evaluation.

The metric used may be based
on an angular difference between the x axis, running in the direction of travel, at the starting point and the reference point of the hypothesis, in other words the parallelism is determined,
on the Euclidean distance between the reference points of the trajectory and the hypothesis, or on the deviation of the hypothesis from the accurate map by a highly accurate GPS position in conjunction with a highly accurate map.

Further optionally, the predefined distance of the reference points from the starting point is between 10 m and 200 m, in particular, 30 m. Distances of less than 10 m have less informative value, since the angular difference or the Euclidean distance is too small. Distances of less than 200 m are subject to an excessively high level of inaccuracy, which comes about owing to the propagation of errors during the production of the reference from manually traveled-along trajectories.

The disclosed apparatus for the evaluation of detection results of components for roadway detection, of the roadway estimated by a roadway estimation process, and/or of the planned trajectory of the driver assistance systems of an ego transportation vehicle which are using, wherein the detection results, the estimated roadway and the planned trajectory are referred to as a hypothesis, and wherein the apparatus for carrying out the method described above comprises a component for roadway detection, a device for roadway estimation and/or a driver assistance system, a device for the evaluation of the hypothesis, and a device for the classification of the hypothesis.

The disclosed system for the offline evaluation of manually traveled-along trajectories in various surroundings scenarios comprises a database for storing data records relating to the manually traveled-along trajectories, the sensor data, the detections and the hypotheses acquired for each manual trajectory as well as context data of roadway sections, a device for acquiring information about the road profile from the data records, such as, for example, roadway markings, curbstones, transportation vehicle in front, crash barriers etc., a device for estimating the road profile from the information about the road profile which acquires the estimated road profile, a device for acquiring travel trajectories from the estimations of the road profile, wherein a travel trajectory is acquired for the respective estimated road profile, an evaluation device for applying a predefined metric for the evaluation of the information about the road profile, the evaluation of the estimated road profile and the evaluation of the acquired travel trajectory for the estimated road profile, a device for keeping available at least one evaluation metric, and an output device which makes available the evaluation results.

The system may also comprise a device which extracts data records from the database, obtains relevant data from the data records and makes it available to the evaluation device so that the evaluation results are equipped with relevant data.

The relevant data may also include GPS coordinates which relate to a corresponding roadway section.

The evaluation results may also relate to an assessment of the roadway sections with respect to the availability for an automatic driving function.

An availability map for an automatic driving function may also be determined from the evaluation results.

The availability map may contain information about the availability of the automatic driving functions and of the devices for roadway detection and roadway estimation.

By such an availability map it is then possible to determine, in what is referred to as the "shadow mode", whether the road sections are suitable for an automatic driving function. In other words, a plurality of road sections are traveled along manually to record data from sensors and functions. In this context, the automatic driving functions are not activated. By offline processing, the collected data are produced with the presented evaluation framework whose result can be represented as an availability map. The data for this offline processing can be collected and made available by a plurality of transportation vehicles, i.e., by a fleet.

In summary, the method relates to the development of a generic evaluation framework of devices for roadway detection. In this context, the data are recorded by manual driving and the traveled-along trajectory forms the reference, that is to say what is referred to as the ground-truth data. In comparison with the use of highly accurate maps and highly accurate DGPS this is a significantly more favorable solution.

In detail, all the components of the roadway detection and driver assistance systems with the driving function can be evaluated, specifically sensors for roadway detection, for example, detectors for roadway markings, curbstones, etc., roadway detection in its entirety, and driver assistance systems on the basis of the planned trajectories, and to provide a system for producing availability maps for an automatic driving function on the basis of these evaluation results.

In addition, various evaluation metrics can be defined and evaluated, for example, angular deviation, lateral offset, availability in hours or kilometers. In addition, the evaluation system can be expanded with new metrics without the system having to be changed.

The benefits are that simultaneous evaluation of a plurality of information sources is possible independently of the highly accurate GPS receiver and highly accurate map, wherein the method and/or the system can also be used for the evaluation of a parking garage pilot. In addition to the different information sources, roadway detection and driver assistance systems with a driving function can be evaluated at different levels.

It is clear that owing to the parallelism by the manually traveled-along trajectory and the evaluation of the parallelism it is only possible to evaluate ego lanes. A change of lane of the ego transportation vehicle brings about incorrect results. This can be avoided by filtering lane changes. In addition, possibilities of making a turn at intersections and on car journeys falsify the evaluation results, which can also be taken into account by filtering.

FIG. 1 illustrates in a schematic illustration the problems which occur during an evaluation of systems for roadway detection, such as are used in driver assistance systems. Systems for roadway detection are understood to be both sensors for roadway detection, roadway estimation and driver assistance systems with a driving function themselves. In this context, their common property consists in the fact that a system for roadway detection makes available a prediction about the future trajectory of the ego transportation vehicle, which prediction is referred to here throughout as a hypothesis.

An ego transportation vehicle 1, which is equipped here in the example with a highly accurate GPS 2, drives on a roadway 3 with two lanes 4, 5, wherein the ego transportation vehicle 1 moves on the left-hand lane 5. The two lanes 4, 5 are separated from one another by markings, specifically a right-hand continuous marking 6, a central marking 7 and a left-hand marking 8.

In front of the ego transportation vehicle 1 there is a transportation vehicle 9 traveling ahead on the adjacent lane 4, it being assumed that both transportation vehicles 1, 9 are each moving on the lane centers 10, 11 of the two lanes. For the sake of clarification of the situation, the two lane centers 10, 11 of the two lanes 4, 5 are shown in FIG. 1. In addition, the trajectory 12 of the ego transportation vehicle which is planned by a lane assist or highway pilot is shown by a dashed line, the trajectory 12 running along the lane center 11 of the left-hand lane 5. This planned trajectory 12 is therefore a hypothesis in the sense mentioned above. In this context, the left-hand marking 8 has been detected by the lane assist or highway pilot, which is expressed by the characterization 13.

If an ACC system is present in the ego transportation vehicle 1, the ACC system detects the transportation vehicle 9 traveling ahead and a trajectory 14 is determined, by which trajectory 14 the ego transportation vehicle 1 can cut in behind the transportation vehicle 9 traveling ahead on the right-hand lane 4.

In addition, the ego transportation vehicle 1 could detect the left-hand marking 7 of the right-hand lane 4, i.e., the central marking 7, and on the basis of the detection of the left-hand marking 7 could propose a possible trajectory 16 in the direction of the right-hand lane marking 6 based on the detection result 15, which detects the right-hand marking 6 of the right-hand lane 4.

Therefore, the question arises as to which of the three possible hypotheses, the planned trajectory 12 along the lane center 11 of the left-hand lane 5, the trajectory 14 which runs behind the transportation vehicle 9 traveling ahead or the trajectory 16 running in the direction of the right-hand lane marking 6 is the right one. It is also clear from FIG. 1 that the trajectory 12 running along the lane center 11 of the left-hand lane 5 is the correct hypothesis.

A decision about the relevance of the three hypotheses 12, 14 and 16 could be made, for example, by a highly accurate GPS receiver together with a highly accurate map, but this constitutes the most expensive solution by far. In addition, highly accurate maps are available only for certain sections of the road network.

Figure 2:
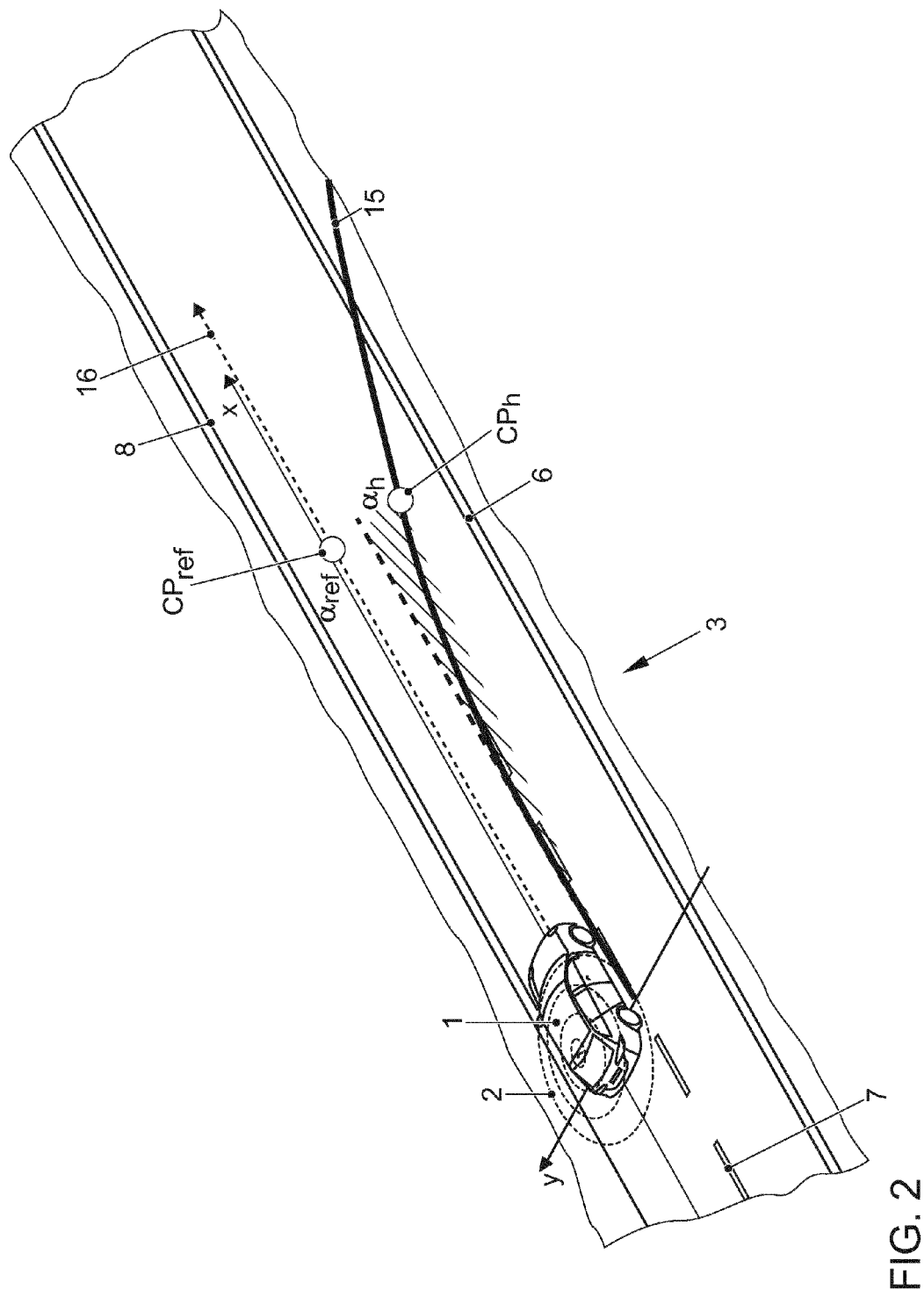
FIG. 2 shows an illustration of a metric.

FIG. 2 shows the use of a metric on the basis of the manually traveled-along trajectory 17 of the ego transportation vehicle 1 with GPS 2 on the roadway 3 for the evaluation of the systems for roadway detection, wherein in FIG. 2 the detection 15 starting from the central marking 7 in the direction of the right-hand roadway edge marking 6 is illustrated as a hypothesis to be evaluated. To define the metric, a transportation vehicle-fixed x-y coordinate system is used, wherein the x direction points in the direction of travel of the ego transportation vehicle 1, and the y direction points perpendicularly with respect thereto. In addition, at a predefined distance, reference points CPref and CPH are defined, wherein the predefined distance lies in the range between 10 m and 200 m, wherein optionally 30 m is used. In this context, the reference point CPref relates to the manually traveled-along trajectory 17, and the reference point CPH relates to the hypothesis 15 under consideration, in the present example the detection 15 of the right-hand roadway marking 6 starting from the central marking 7. The respective angles αref and αh with respect to the x axis and the absolute value of the difference between the two angles is determined starting from the starting time t=t0, in the example here the current location of the ego transportation vehicle 1, at the time t=t1 when the reference point CPref is reached, which also corresponds to the time when the reference point CPh of the hypothesis is reached, that is to say:

$$\Delta\alpha = |\alpha_{ref} - \alpha_h| \quad (1)$$

This angular deviation $\Delta\alpha$ between the reference 17 and the hypothesis 15 is used to assess or evaluate the hypothesis.

Figure 3:
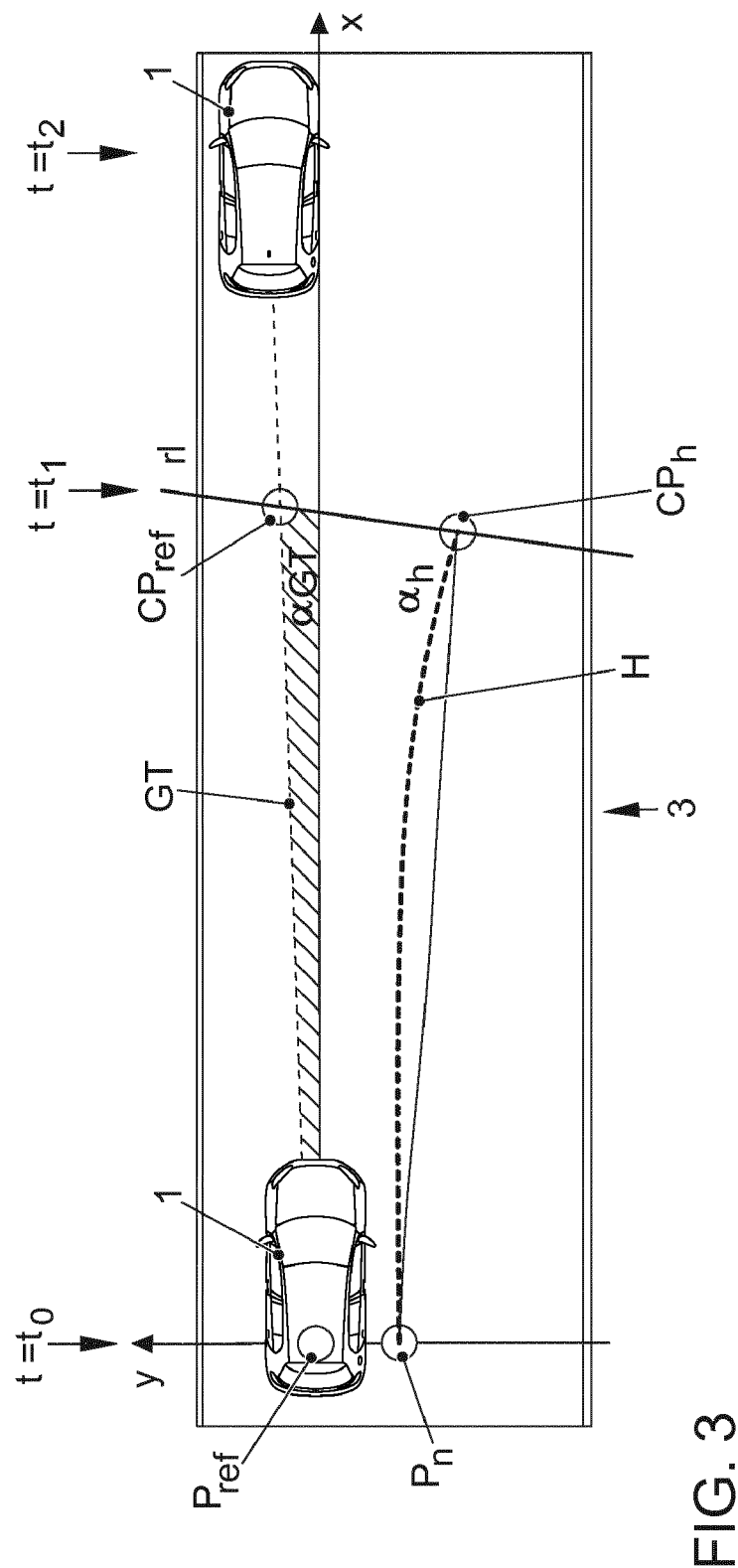
FIG. 3 shows the metric in a precise illustration.

FIG. 3 shows the metric used in relatively great detail. The ego transportation vehicle 1 which moves on a roadway 3 is illustrated, wherein the ego transportation vehicle produces a transportation vehicle-fixed coordinate system x-y at the starting time t=t0, and the zero point Pref with the coordinates (0,0) of the x-y coordinate system lies in the center of the rear transportation vehicle axis of the ego transportation vehicle 1 here.

Starting from the time t=t0, the ego transportation vehicle 1 moves at the velocity v=(vx, vy) along the manually traveled-along trajectory GT (ground-truth) which serves as a reference trajectory. The manually traveled-along trajectory GT usually does not follow the x-axis which is defined at the time t=t0 and which would correspond, for example, in the case of a straight roadway, to the central line of the lane of the ego transportation vehicle 1. At the time t=t1, the ego transportation vehicle 1 reaches the reference point CPref with the coordinates (xt1, yt1) which is at the distance r1 from the starting point Pref. At a later time t2, the ego transportation vehicle has reached the position which is illustrated in FIG. 3 and which is not relevant for the instantaneous consideration for the definition of the basic metric.

For the consideration of the hypothesis H which is illustrated in FIG. 3, a profile thereof starts at the point Ph with the coordinates (xh,0,yh,0) in the illustration. At the time t=t1, the hypothesis H has reached the reference point CPh which is at the distance r1 from the starting point Ph of the hypothesis H. The above equation (1) for the angular difference $\Delta\alpha$ can therefore be written as:

$$\Delta\hat{\alpha} = \left| \arctan\left(\frac{y_{h,cp} - y_{h,0}}{x_{h,cp} - x_{h,0}}\right) - \arctan\left(\frac{y_{t1}}{x_{t1}}\right) \right| \quad (2)$$

In other words, information can be obtained about the parallelism of the hypothesis H with respect to the traveled-along path GT with the metric according to equation (1) and (2), which is based on the manually traveled-along path. Therefore, the smaller the angular difference $\Delta\alpha$, the better the hypothesis H. This metric has already been used in the above-mentioned publication by T. T. Nguyen.

Figure 4:
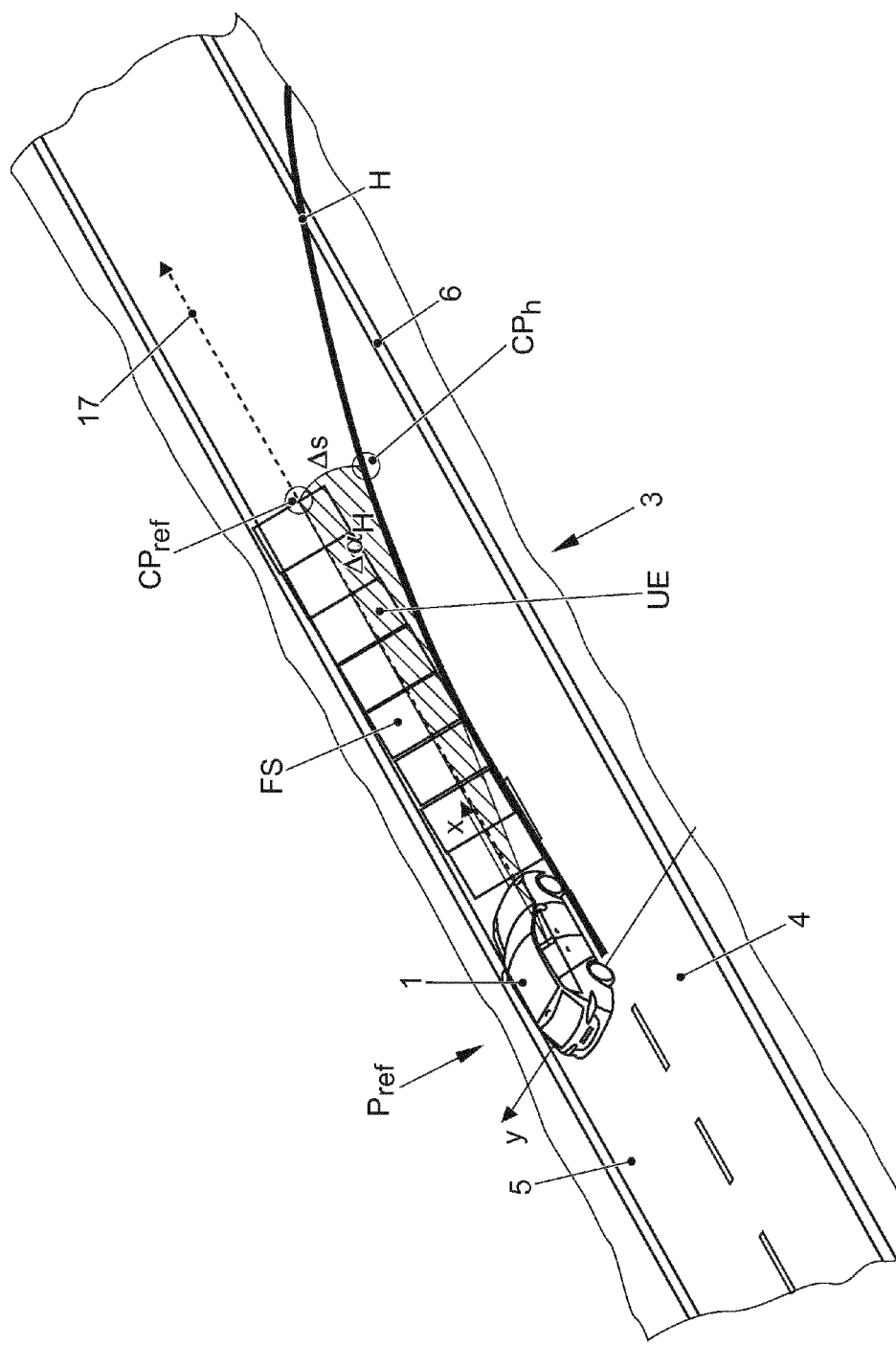
FIG. 4 shows an illustration of further possible metrics.

FIG. 4 shows further possible metrics such as can be used for the evaluation of systems for roadway detection. Again, the ego transportation vehicle 1 is illustrated, the ego transportation vehicle moving on a roadway 3 with the two lanes 4, 5 on the left-hand lane 5 in the x direction in the transportation vehicle-based x-y coordinate system. In addition, a hypothesis H is illustrated which runs in the direction of the detected right-hand roadway edge marking 6 and corresponds to the detection result 15 in FIG. 1. The manually traveled-along trajectory is now not used as a reference, as in FIG. 3, but instead the x direction of the coordinate system serves as the reference trajectory.

Likewise, two reference points are defined, specifically CPref and CPh, wherein CPref is a point on the x axis at the distance r1, while CPh is the corresponding reference point on the hypothesis. The angular deviation $\Delta\alpha H$ then describes the angular deviation between the hypothesis H at the reference point CRH and the x axis. The trajectory which is actually traveled along manually is not significant for this metric.

In addition it is possible to use the distance Δs between the two reference points CPref and CPH as a measure for the deviation of the hypothesis H from the straight-ahead orientation implemented by the x axis or a manually traveled-along trajectory (not illustrated).

Finally it is possible to take the overlap UE of the surface which is extended by the hypothesis H and the x axis between the origin Pref of the coordinate system and the two reference points, with the surface of the assumed driving tube FS of the ego transportation vehicle along the x axis from the origin Pref up to the reference point CPref as a measure of the deviation of the hypothesis H from the assumed straight-ahead travel.

Figure 5:
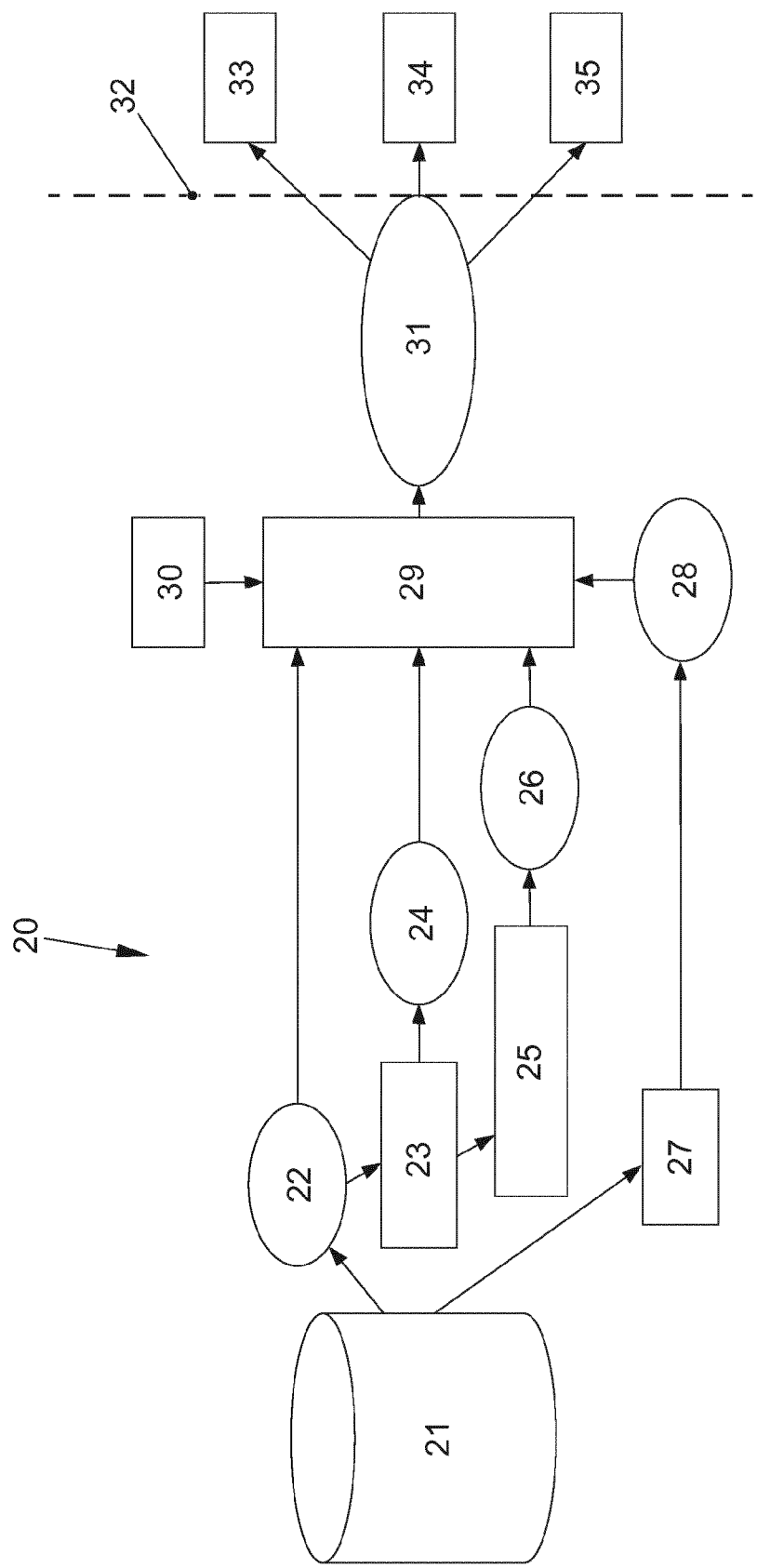
FIG. 5 shows the evaluation concept in a schematic illustration.

FIG. 5 shows the proposed generic evaluation concept which can be used to produce an availability map 34 on the basis of the collected results of measuring journeys, from which availability map 34 it is possible to infer, for different sections of roadways, which predicted trajectories of the different sensors and/or driver assistance systems, that is to say the hypotheses, can be trusted to such an extent that, for example, automatic travel on the respective section is possible so that an automatic driving function can or cannot be activated in a predictive state.

The evaluation system 20 comprises a database 21 which contains the recordings, i.e., data records, about the manually traveled-along evaluation journeys in various scenarios, wherein each data record also has context data in addition to the sensor data. These context data can be extracted from the map or are labeled manually and describe the current situation, such as, for example: regions with poor markings or without markings, the person driving in front is currently carrying out a lane change. Various scenarios are, for example, journeys in an urban environment, on the highway or on a country road. These data are stored alongside the pure sensor data together with the recording time and the position obtained by GPS as context data of the sensor data as a data record.

The results 22 relating to the roadway profile, that is to say sensor results 22, are extracted from the database 21. This comprises information about the roadway markings, information from the digital map, detected curbstones, crash barriers, the free path etc. acquired from a surroundings map. These conditions acquired directly from the respective sensor are fed to an evaluation device 29 which carries out evaluation of the sensor results by the metric which is used and which can be selected from a set 30 of predefined metrics. The evaluation results 31 are then accessible together, for example, with the GPS position information, via an interface 32 which can be accessed externally. In this context, the GPS data and further relevant data which are relevant to the respective evaluation result can be obtained in parallel from the database 21 by a data extraction operation 27, and can be fed to the evaluation device 29 after filtering 28 of the required relevant data, so that a complete evaluation result data record 31 is available.

Roadway estimations 23, which result in estimated roadway profiles 24, are carried out by the sensor results 22. The estimated roadway profiles are subjected to an evaluation 29 by the selected evaluation metric from the quantity 30 of metrics present. The estimated roadways evaluated in the evaluation 29 are provided with further relevant data 28, such as GPS position data, and made available as evaluation results 31 to the interface 32.

The roadway estimations 23 are also fed to respective driver assistance systems 25 and processed there, wherein the result of the processing results in planned trajectories 26 which are subjected to an evaluation 29 so that the evaluation results are made available together with relevant data 28 such as GPS as evaluation results 31 to the interface 32.

The evaluation data records 31 can then be fed to a performance indicator 33 of the roadway estimation, an availability map 34 a fault analysis 35 via the interface 32.

Figure 6:
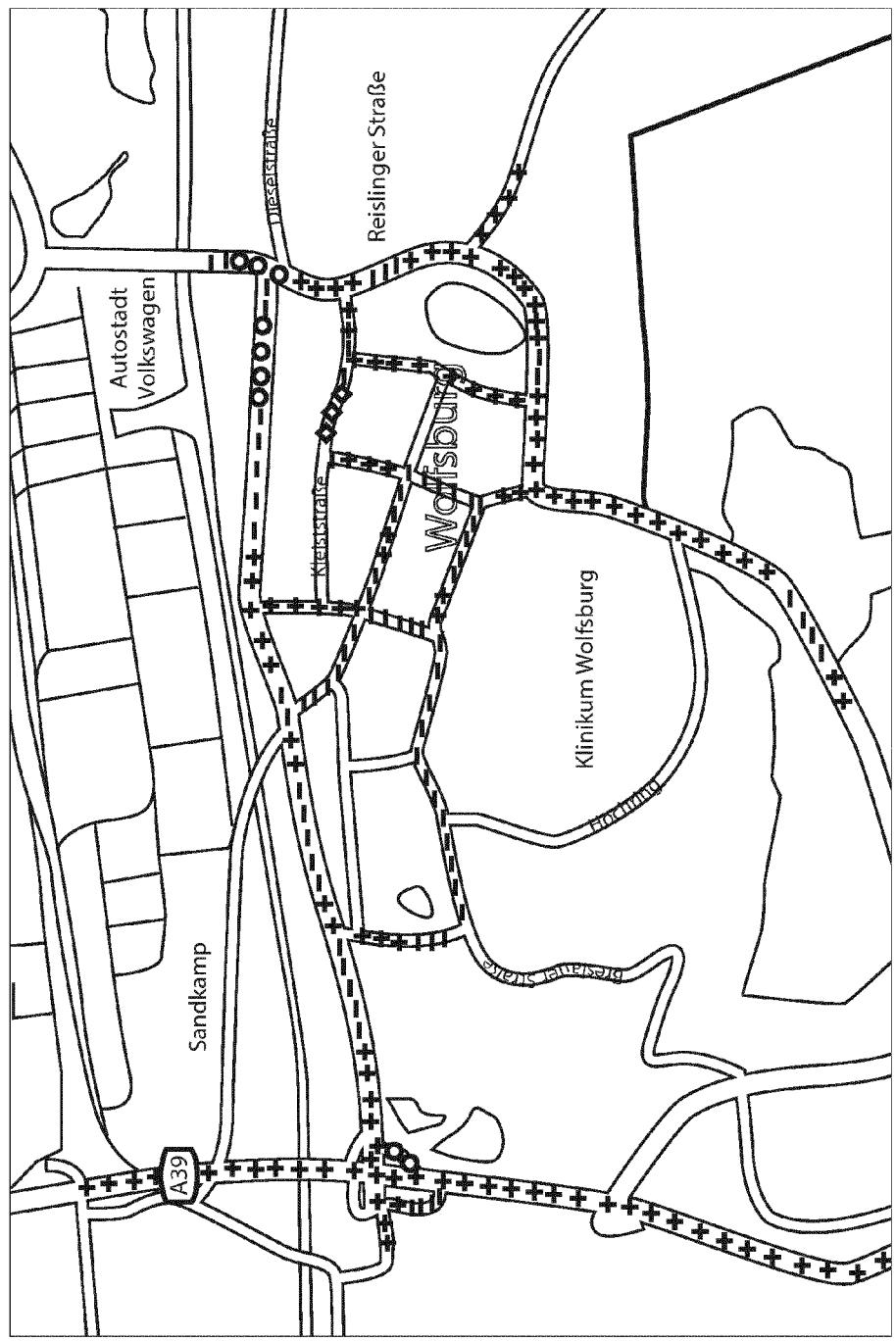
FIG. 6 shows an example of an availability map.

FIG. 6 shows an availability map which can be compiled from the evaluation results of the evaluation system in FIG. 4. FIG. 6 is an excerpt of a map of the surroundings of Wolfsburg, wherein the roads and highways are marked according to the availability for, for example, an automatic driving function. Here, "+" in the roadway section marked in this way left-hand and right-hand roadway markings can be discerned so that an automatic driving function can be determined on the basis of the center of the roadway, "−" here only hypotheses with the left-hand markings can be used for an automatic driving function, "o" in these sections no correct hypotheses are available so that an automatic driving function is not available here, and "◇" in these sections only hypotheses based on right-hand markings can be used.

An availability map is produced by a reliability estimation of the hypotheses of the devices for roadway detection, as is explained with reference to FIG. 5. In this context, the route sections are traveled along repeatedly to obtain the differences between the hypotheses and the traveled-along trajectories, wherein the differences are recorded in a database, referred to as a backend 21 in FIG. 5. An availability map of the automatic driving function is produced from the recorded data along the lines of "where can the function be activated?". The availability map which is produced in this way forms the basis for enabling of the highway pilot function.

Since it is possible to detect in advance from the availability map which sensors will be possible in which road section for an automatic driving function or whether no roadway detection functions at all for a specific section of a route owing to a lack of positive evaluation results, the automatic driving function can act correspondingly and warn the driver early for the sections without reliable sensor system, so that the transfer of the driving function to the driver can take place without problems.

LIST OF REFERENCE SYMBOLS

1 Ego transportation vehicle
2 GPS
3 Roadway
4 Right-hand lane
5 Left-hand lane
6 Right-hand marking
7 Central marking
8 Left-hand marking
9 Transportation vehicle traveling ahead—ACC object
10 Center of lane
11 Center of lane
12 Hypothesis of planned trajectory lane assist
13 Detected left-hand marking
14 Hypothesis of planned trajectory ACC
15 Hypothesis of detection result for right-hand roadway edge
16 Hypothesis of ego lane along the detection result 15

17 Manually traveled-along trajectory
GT Ground-truth data—manual trajectory
H Hypothesis
$\alpha_{ref}$ Reference angle
$\alpha_h$ Angle of hypothesis
$\Delta\alpha$ Angular difference
$\Delta\alpha_H$ Angular difference
t0 Time
t1 Time
t2 Time
$CP_{ref}$ Reference point for manually traveled-along trajectory
$CP_h$ Reference point for hypothesis
r1 Reference length/reference distance
$\Delta s$ Euclidean distance between the reference points
UE Overlap
FS Surface of assumed driving tube
20 Evaluation system
21 Database
22 Sensor results
23 Roadway estimation
24 Determined roadways
25 Driving assistance systems
26 Planned trajectories
27 Extracted data
28 Relevant data
29 Application of the metric
30 Quantity of possible metrics
31 Results with GPS coordinates
32 Interface
33 Performance indicator
34 Availability map
35 Fault analysis
+ Hypothesis on the basis of both left-hand and right-hand roadway markings
− Hypothesis with only left-hand markings
O No hypothesis
◇ Hypothesis with only right-hand markings

The invention claimed is:

1. A method for the evaluation of detection results of components for roadway detection, of a roadway estimated by a roadway estimation process and/or of a planned trajectory of a driver assistance systems of an ego transportation vehicle using the roadway, wherein the detection results, an estimated roadway, and/or the planned trajectory are referred to as a hypothesis, the method comprising:
using a metric for evaluation of devices or of the driver assistance systems wherein the metric is based on a trajectory manually traveled along by the ego transportation vehicle, wherein a deviation between the manually traveled-along trajectory and the hypothesis for predefined reference points is determined at a predefined distance from a starting point in a transportation vehicle-based x-y coordinate system;
determining, based on the evaluation of the devices or of the driver assistance systems, whether the hypothesis of the components for roadway detection, the hypothesis of the roadway estimation, and/or the hypothesis of the planned trajectory of the driver assistance system fulfill predefined criteria;
determining, at a starting time, an angle between the reference point at the predefined distance between the manually traveled-along trajectory and the x axis, running in a direction of travel of the transportation vehicle-based coordinate system;
determining, at the starting time, an angle between the reference point at the predefined distance between the hypothesis and the x axis, running in the direction of travel, of the transportation vehicle-based coordinate system;
determining an absolute value of a difference between the two angles;
for the evaluation of the device or of the driver assistance system, comparing the absolute value of the angular difference with a predefined threshold;
classifying the hypothesis as usable or unusable based on the comparison;
producing an availability map for an automatic driving function based on results of the evaluation of the devices or of the driver assistance systems that indicates sections of the roadway that are usable for the automatic driving function; and
activating the automatic driving function on at least one section of the roadway that has been indicated by the availability map to be usable for the automatic driving function.

2. The method of claim 1, wherein the predefined threshold is 1° to 3°.

3. The method of claim 2, wherein the predefined threshold is 2°.

4. The method of claim 1, comprising:
determining, in addition to the angular difference, the Euclidean distance between the reference points of the manually traveled-along trajectory and the hypothesis; and
using the determined Euclidean distance as a further metric for the evaluation of the hypothesis.

5. The method of claim 1, wherein the metric is based on:
an angular difference between the x axis, running in the direction of travel, at the starting time and the reference point of the hypothesis,
the Euclidean distance between the reference points of the manually traveled-along trajectory and the hypothesis, or
on the deviation of the hypothesis from the accurate map by a highly accurate GPS position in conjunction with a highly accurate map.

6. The method of claim 1, wherein the distance is a predefined distance of the reference points from the starting point between 10 meters and 200 meters.

7. The method of claim 6, wherein the distance is a predefined distance of the reference points from the starting point of 30 meters.

8. An apparatus for evaluation of detection results of components for roadway detection, of the roadway estimated by a roadway estimation process and/or of a planned trajectory of a driver assistance systems of an ego transportation vehicle, wherein the detection results, the estimated roadway, and the planned trajectory are referred to as a hypothesis, wherein the apparatus comprises:
a device for a driver assistance system for roadway detection;
a device for the evaluation of the hypothesis; and
a device for the classification of the hypothesis, wherein the evaluation of the hypothesis uses a metric for evaluation of the devices or of the driver assistance systems, wherein the metric is based on a trajectory manually traveled along by the ego transportation vehicle, wherein a deviation between the manually traveled-along trajectory and the hypothesis for predefined reference points is determined at a predefined distance from a starting point in a transportation vehicle-based x-y coordinate system, wherein, based on the evaluation of the devices or of the driver assistance systems, it is determined whether the hypothesis of the components for roadway detection, the hypothesis of the roadway estimation, and/or the hypothesis of planned trajectory of the driver assistance system fulfill predefined criteria, wherein, at a starting time, an angle between the reference point at the predefined distance between the manually traveled-along trajectory and the x axis, running in the direction of travel of the transportation vehicle-based coordinate system is determined, wherein, at the starting time, an angle between the reference point at the predefined distance between the hypothesis and the x axis, running in the direction of travel, of the transportation vehicle-based coordinate system is determined, wherein an absolute value of a difference between the two angles is determined, wherein, for the evaluation of the device or of the driver assistance system, the absolute value of the angular difference is compared with a predefined threshold, wherein the hypothesis is classified as usable or unusable based on the comparison, wherein an availability map for an automatic driving function is produced based on results of the evaluation of the devices or of the driver assistance systems that indicates sections of the roadway that are usable for the automatic driving function, and wherein the automatic driving function is activated on at least one section of the roadway that has been indicated by the availability map to be usable for the automatic driving function.

9. A system for off-line evaluation of manually traveled-along trajectories in various surroundings scenarios, the system comprising:

a database for storing data records relating to the manually traveled-along trajectories and a hypotheses determined for each manual trajectory as well as context data of roadway sections;

a device for acquiring sensor information about a road profile from the data records;

a device for estimating the road profile from information about the road profile which acquires an estimated road profile;

a device for acquiring travel trajectories from the estimations of the road profile, wherein a travel trajectory is acquired for the respective estimated road profile;

an evaluation device for applying a predefined metric for the evaluation of the information about the road profile, the evaluation of the estimated road profile and the evaluation of the acquired travel trajectory for the estimated road profile, wherein the evaluations use a metric for evaluation of the devices or of a driver assistance system, wherein the metric is based on the manual trajectory, wherein a deviation between the manual trajectory and the hypothesis for predefined reference points is determined at a predefined distance from a starting point in a transportation vehicle-based x-y coordinate system, and wherein, based on the evaluation, it is determined whether the hypothesis fulfills predefined criteria;

a device for keeping available at least one evaluation metric; and a device for making available evaluation results, wherein, at a starting time, an angle between the reference point at the predefined distance between the manual trajectory and the x axis, running in the direction of travel of the transportation vehicle-based coordinate system is determined, wherein, at the starting time, an angle between the reference point at the predefined distance between the hypothesis and the x axis, running in the direction of travel, of the transportation vehicle-based coordinate system is determined, wherein an absolute value of a difference between the two angles is determined, wherein, for the evaluation of the device or of the driver assistance system, the absolute value of the angular difference is compared with a predefined threshold, wherein the hypothesis is classified as usable or unusable based on the comparison, wherein an availability map for an automatic driving function is produced based on the evaluation results that indicates sections of the roadway that are usable for the automatic driving function, and wherein the automatic driving function is activated on at least one section of the roadway that has been indicated by the availability map to be usable for the automatic driving function.

10. The system of claim 9, wherein a device extracts data records from the database, obtains relevant data from the data records and makes the data available to the evaluation device so evaluation results are equipped with relevant data.

11. The system of claim 10, wherein the relevant data are formed by GPS coordinates which relate to the corresponding roadway section.

12. The system of claim 9, wherein the evaluation results relate to an evaluation of the roadway sections with respect to the availability for an automatic driving function.

13. The system of claim 12, wherein the availability map contains information about the availability of the automatic driving functions and of the devices for roadway detection.

14. The system of claim 12, wherein a fault analysis and a performance indicator are derived from the evaluation results.

* * * * *